(12) United States Patent
Volk, Jr.

(10) Patent No.: US 8,419,931 B2
(45) Date of Patent: Apr. 16, 2013

(54) SILICONE FREE ANTI-FOAMING PROCESS AND CONTROLLED FOAMING PROCESS FOR PETROLEUM COKING

(75) Inventor: Michael Volk, Jr., Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 300 days.

(21) Appl. No.: 12/738,359

(22) PCT Filed: Jan. 7, 2009

(86) PCT No.: PCT/US2009/030335
§ 371 (c)(1),
(2), (4) Date: Apr. 16, 2010

(87) PCT Pub. No.: WO2010/080147
PCT Pub. Date: Jul. 15, 2010

(65) Prior Publication Data
US 2010/0300940 A1  Dec. 2, 2010

(51) Int. Cl.
*C10G 9/00* (2006.01)
(52) U.S. Cl.
USPC .......................................................... 208/131
(58) Field of Classification Search .................. 208/113, 208/131, 401; 44/281; 202/96; 252/321
See application file for complete search history.

(56) References Cited

U.S. PATENT DOCUMENTS

| | | | |
|---|---|---|---|
| 4,345,991 A * | 8/1982 | Stegelman | 208/78 |
| 4,518,487 A | 5/1985 | Graf et al. | |
| 4,612,109 A | 9/1986 | Dillon et al. | |
| 4,720,338 A | 1/1988 | Newman et al. | |
| 5,028,311 A | 7/1991 | Shigley et al. | |
| 5,169,560 A | 12/1992 | Hart | |
| 5,296,132 A | 3/1994 | Hart | |
| 5,370,785 A * | 12/1994 | Beck et al. | 208/46 |
| 5,389,299 A | 2/1995 | Hart | |
| 5,472,637 A | 12/1995 | Hart | |
| 5,602,186 A * | 2/1997 | Myers et al. | 521/41 |
| 5,667,669 A | 9/1997 | Hart | |
| 5,800,738 A | 9/1998 | Hart | |
| 6,117,308 A | 9/2000 | Ganji | |
| 6,764,592 B1 | 7/2004 | Ganji | |
| 7,128,812 B1 | 10/2006 | Cupit | |
| 7,252,756 B2 * | 8/2007 | Gong et al. | 208/240 |
| 2008/0096787 A1 | 4/2008 | Cauley et al. | |

OTHER PUBLICATIONS

Vasant P. Thakkar et al.; LCO Upgrading a Novel Approach for Greater Added AValue and Improved Returns; 2005 UOP LLC; pp. 1-15.
Rick Wodnick et al.; Delayed Coking Advances; PTQ Q4 2005; pp. 1-6.
Paul J. Ellis et al.; Tutorial: Delayed Coking Fundamentals; AIChE 1998 Spring National Meeting; pp. 1-20.

* cited by examiner

Primary Examiner — Randy Boyer
(74) Attorney, Agent, or Firm — McAfee & Taft

(57) ABSTRACT

The current invention provides an improved petroleum coking process wherein the risk of silicone poisoning of units downstream of the coke drums is eliminated. The method of the current invention controls the foam layer within the coke drum by injection of a non-silicone anti-foam agent, preferably a tire oil. In another embodiment, the current invention provides a controlled foaming method which increases the liquid production from the coke drum. In the controlled foaming method, an anti-foam agent is cyclically injected into the drum early in the coke drum fill cycle. The cyclic injections manage the foam layer without inducing the induction phase in the coke feedstock, thereby increasing the total volume of feedstock received by the coke drum.

29 Claims, 1 Drawing Sheet

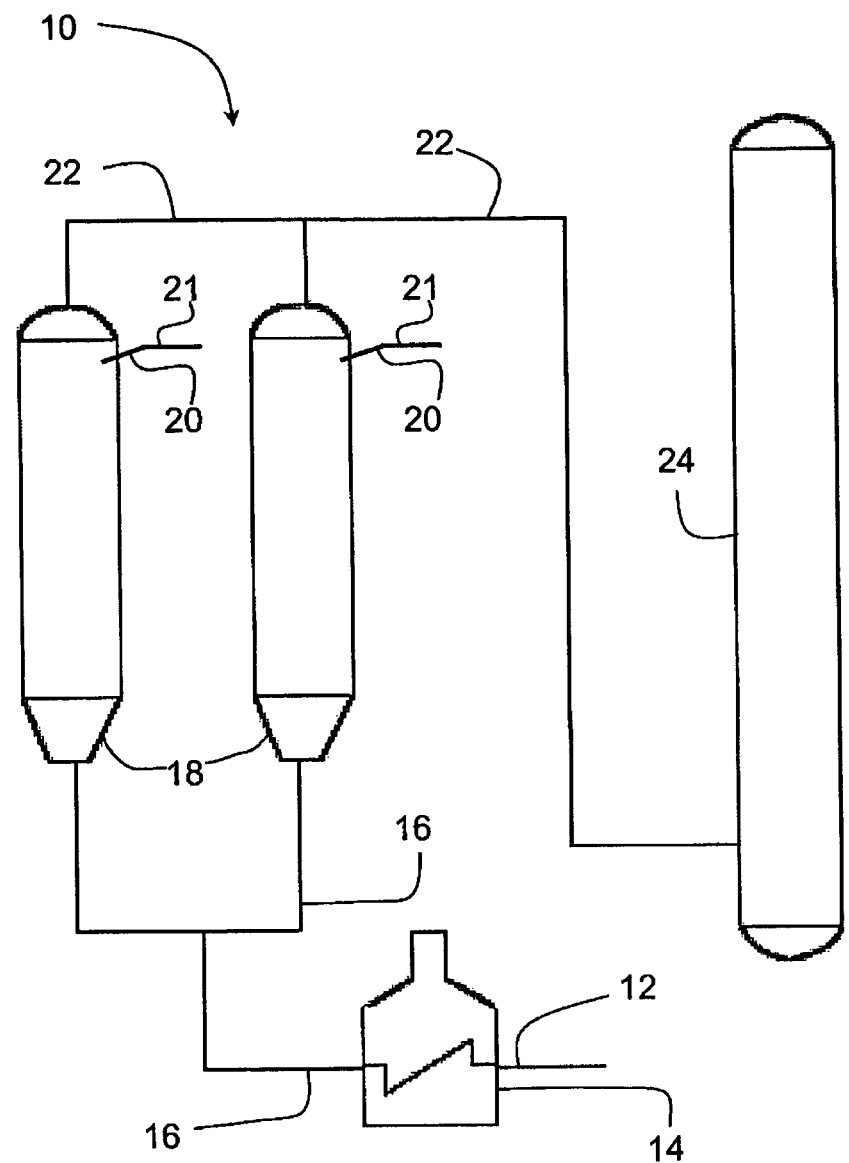
Prior Art Apparatus

SILICONE FREE ANTI-FOAMING PROCESS AND CONTROLLED FOAMING PROCESS FOR PETROLEUM COKING

BACKGROUND OF THE INVENTION

A modern petroleum refinery is designed to maximize the production of select liquid products from crude oil. In addition to the well known atmospheric and vacuum distillation processes used to provide refined products, many refineries utilize petroleum cokers to further process the residual materials remaining after distillation. The three common coking processes, fluid, flexi and delayed coking, have been used for decades. As such the common operating conditions for petroleum coking are well known throughout the industry.

During the fill cycle of the coking process, a foam layer forms on the surface of the feedstock as it fills the coke drum. Operators must control foaming within the coke drums otherwise the foam will enter the overhead vapor line resulting in a blockage. The preferred method for precluding foam-over, requires injecting a silicone based anti-foam agent (AF agent or material) into the drum. According to a tutorial presented by Great Lakes Carbon Corporation at the AIChE 1998 Spring National Meeting, the preferred method for controlling foam requires continuous injection of an AF agent. According to the tutorial, "a Dow Chemical Company representative stated in 1981 that it is easier to prevent a foam than it is to kill a foam." The tutorial further noted that continuous injection reduces the problems associated with foam and reduces the quantity of anti-foam agent required.

Management of the silicone anti-foam agent injection is critical as any carry-over of the silicone material through the overhead vapor line will poison the catalyst found in downstream operating units such as the hydrotreating unit. Thus, operations which use too little silicone based AF agent may foam-over and carry the silicone downstream. However, excessive usage of silicone based AF agent, due to continuous injection, increases costs, may reduce the production of valuable liquids and may lead to an undesirable coke material.

Clearly, further improvements are desired in the current coking process. In particular, improved processes which control foaming in order to enhance liquid yield while improving the coke material are desired. Further, a coking foam control method which does not utilize a silicone based AF agent will particularly enhance the coking process.

SUMMARY OF THE INVENTION

In one embodiment, the current invention provides a method for precluding foam-over during a petroleum coking operations. The method of the current invention comprises the steps of initiating the fill cycle of the coking process by filling a coke drum with a coke feedstock. During the fill cycle, feedstock level within the drum is monitored. Feedstock flow to the drum stops when the drum has filled to about 66% to about 80% of the internal volume of coke drum. To preclude foam-over into an overhead line associated with the coke drum, sufficient volume of non-silicone anti-foam agent is injected into the coke drum to control or preclude the formation of foam within said coke drum. Subsequently the method injects a sufficient volume of non-silicone anti-foam agent into the drum to kill the foam layer and initiate the coke induction period.

In another embodiment, the current invention provides a method for controlling the foam layer in a coke drum during the fill cycle of a coking process. As the coke drum is filled with feedstock, the resulting growth of a foam layer is monitored. Either when the foam layer reaches a predetermined height above the fluid feedstock or when foam is initially detected, cyclical injections of anti-foam agent begins. In the method of the current invention, the cyclical injections provide a injection period wherein sufficient anti-foam agent is injected to at least reduce the height of the foam. Following the injection, the method provides for a rest period wherein the foam layer is allowed to reform or reestablish. The volume of anti-foam agent injected during the injection phase of the cycle is initial less than that amount required to initiate the induction period within the feedstock. Subsequently, when the coke drum has filled to the desired level, sufficient anti-foam agent is injected to induce the induction period by killing the foam.

In a further embodiment, the current invention is directed to a controlled foaming method of coking. In this method, an AF agent is injected into the coke drum during fill operations. The AF agent is cyclically injected during the fill process in a manner determined to maintain the foam layer above the feedstock at a height of less than 10 feet above the fluid level of the feedstock. Preferably, the foam layer is maintained between a height of about one to about three feet by the cyclical injections of AF agent as the coke drum is filled.

BRIEF DESCRIPTION OF THE DRAWING

FIG. 1 depicts a basic petroleum coking system known in the prior art.

DETAILED DISCLOSURE OF THE PREFERRED EMBODIMENTS

Feedstocks to all cokers vary from time to time. Therefore, one skilled in the art is accustomed to adjusting injection rates, times and quantities of AF agent to account for the variables of each feedstock. Since delayed coking is by far the most common coking method used today, the current invention will be described in the scope of a delayed coking process. However, those skilled in the art will recognize that the following non-silicone anti-foaming methods are equally applicable to fluid and flexi coking methods.

A typical coking operation uses two coking drums. Each drum cycles through eight standard steps:
1. Drum fill/coke conversion—Feedstock enters a preheated drum, which begins to fill with coke. (The time required to fill the drum to the desired level is referred to herein as the fill cycle, fill step or fill time.) Once a drum is full, feedstock is directed to an empty drum and the full drum is brought off-line.
2. Steamout—Steam stripping to help strip out any residual liquid hydrocarbon from the coke.
3. Water quench—Quenching with water of the full, off-line drum until the coke in the drum is cooled to between 200 and 275° F.
4. Draining—Quench water is removed from the off-line coke drum.
5. Unheading—Removal of the top and bottom drum heads from the off-line coke drum.
6. Decoking—High pressure water is used to cut the coke inside the drum. Coke and water pass through the bottom of the drum into the coke-handling system.
7. Heading and testing—Reinstallation of the drum heads and pressure testing of the drum with steam.
8. Warm up—Steam and hot hydrocarbon vapors from the on-line drum are directed through the off-line coke drum.

The drum fill/coke conversion step primarily determines the cycle time for the coke drum. The desired coke product and desired liquid production dictate the time required for the initial step. In most coking operations, cycle times vary between twelve and twenty-four hours with a twenty-four hour cycle being most common. Under these conditions and depending upon drum size, drum processing rates may vary between about 8000 barrels per day and 50000 barrels per day (bpd).

FIG. 1 depicts a basic coking operation 10 including a coker feed line 12 supplying feedstock such as atmospheric or vacuum resid material to a coker furnace 14. Coker furnace 14 heats the coker feedstock to a temperature between about 465° C. and about 510° C. (about 875° F. and about 950° F.). A typical preferred temperature for feedstock exiting coker furnace 14 is between about 495° C. and about 508° C. (915° F. and 945° F.). The hot feedstock passes through feedline 16 to a pre-heated coke drum 18. As drum 18 fills, temperature and pressure typically stabilize between 450° C. to 500° C. (840° F. to 932° F.) at a pressure of about 100 to 450 kPa (14 to 65 psi).

Depending on drum size, fill times may vary between about 8 to about 18 hours. Fill times are readily calculated by those skilled in the art based on the internal volume of coke drum 18 and the feedstock flow rate into drum 18. To maximize production, drum 18 is filled as completely as possible. Typically, nuclear level indicators (not shown) or other suitable devices are used to monitor the fluid level in the drum at various filling stages. Overfilling of drum 18 can lead to "foam-over" and fouling of overhead vapor line 22 with coke. However, when practicing the preferred methods of the current invention, inadvertent foam-over will not poison downstream catalyst as the AF agent does not contain silicone. In conventional processes using silicone based AF agent, drum 18 is typically filled to about two-thirds of the internal volume.

As will be discussed below in detail, AF agent is used to control foam levels and to manipulate the formation of coke. In general AF agent is injected through any conventional nozzle 20 located near the top of drum 18. AF agent is generally stored in a tank (not shown) or other similar device and is pre-heated to a temperature between about 425° C. to about 460° C. (about 800° F. to about 860° F.), as known by those skilled in the art, by any convenient means prior to passing through line 21 to nozzle 20.

During filling of coke drum 18 and during the conversion of the feedstock to coke, the feedstock undergoes a thermal cracking process wherein additional liquid material and gas are produced. The coke drum product, in vapor and gaseous form, exits drum 18 through overhead vapor line 22. Typically, drum outlet vapor temperature is between 410° C. and 455° C. (775° F. and 850° F.). The produced vapors are quenched in overhead vapor line 22 and subsequently pass to a processing unit such as a coker fractionator 24.

In the above described process, injection of AF agent takes place at the conclusion of the fill step of the coking cycle. Most coke drums 18 carry a nozzle 20 or other port suitable for injecting AF agent. As known to those skilled in the art, injection of AF agent preferably occurs at a pressure sufficient to ensure that the AF agent reaches the foam layer prior to being vaporized and swept out of drum 18. AF agent injection rate (pressure and volume/time) will vary depending on the feedstock and foam layer height in drum 18. Under standard operating procedures, AF agent injection begins when drum 18 is about two-thirds full.

Method of Using Non-Silicone AF Agent to Preclude Foam-Over

In one aspect, the current invention provides a method of using a non-silicone AF agent to preclude foam-over in the coking process. The preferred non-silicone AF agent utilized in the current invention is a tire oil generated by pyrolysis or hydropyrolysis of used tires. Methods for producing tire oil have been known since at least the early 1970's. Tire oil particularly suited for use in the current invention will be primarily aromatic in nature. Preferably, the tire oil will be highly aromatic in composition.

Suitable tire oils for use in the current invention are described in U.S. Published Application No. 2008/0096787 and an article entitled "Influence of Process Variables on Oils from Tire Pyrolysis and Hydropyrolysis in a Swept Fixed Bed Reactor" *Energy & Fuels,* 2000, 14 (4) 739-744. For example, the tire oil material prepared by the method disclosed in U.S. Published Application No. 2008/0096787 has an aromaticity of greater than about 95% by weight. Further, the aromaticity of the material described in the *Energy & Fuels* article averaged greater than about 70% by weight. The U.S. Published Application No. 2008/0096787 and the *Energy & Fuels* article are incorporated herein by reference. Finally, the slurry oil, obtained from the catalytic cracking units, having an aromatic content of about 60% to about 75% will also perform satisfactorily in the method of the current invention.

Slurry oil is a product of the catalytic cracking unit (not shown) commonly found in a petroleum refinery. While it is known to use slurry oil as a component of the feedstock to the coker, prior art methods have not used slurry oil as an AF agent. Preferably, the slurry oil is a clarified slurry oil substantially free of catalyst and other materials commonly found in the bottoms of the catalytic cracker.

In the preferred embodiment of the current invention, injection of the non-silicone AF agent through nozzle 20 begins when drum 18 is approximately two-thirds full. The non-silicone AF agent passes into drum 18 at a rate and volume sufficient to preclude foam-over. As known to those skilled in the art, knocking down the foam layer in a manner which precludes reformation of the foam layer, i.e. killing the foam, risks initiating the induction period. The induction period initiates the growth of mesophase domains within the coker feedstock and is generally considered the beginning of coke formation. Thus, timing of the injection of AF agent is delayed as long as possible to maximize fluid production from the coker feedstock.

For discussion purposes, this paragraph assumes that method of the current invention is practiced in a coke drum having a capacity of about 50,000 barrels per day with a nine hour fill cycle. Under standard practices, the AF agent injection occurs over the last 3.5 hours of the fill cycle and about 75 barrels of AF agent will be required. Under these conditions, 3150 gallons of AF agent are injected or 0.16 gallons of AF per barrel of feedstock entering the coke drum during the last 3.5 hours. Thus, the injection rate of AF agent is about 15 gallons per minute. Those skilled in the art will recognize that injection time periods and flow rates necessary to preclude foam-over and to initiate the induction period will vary depending upon the type of feedstock. Preferably, the non-silicone AF agent is injected at a temperature between about 425° C. to about 460° C. (about 800° F. to about 860° F.).

The foregoing description describes the use of a non-silicone AF agent in a common coke drum. However, this method will have application regardless of coke drum size and configuration. As noted in the example, injection of non-silicone AF agent is normally initiated on the basis of drum's fill cycle. Under these conditions, the initial injection of AF agent will preferably begin after about 60% to about 70% of the fill cycle has elapsed, i.e. the feedstock occupies from about 45% to about 60% of the internal drum capacity. During the last 40% to 30% of the fill cycle, non-silicone AF agent is continuously injected into the coke drum to manage the foam layer and ultimately initiate the induction period by killing the foam. Preferably, the foam layer is killed when the coke drum has filled to about 75% of internal capacity.

Although a foam-over remains undesirable, use of a non-silicone AF agent eliminates the risk of poisoning catalysts found in downstream units such as a naptha hydrotreater (not shown). Thus, the method of the current invention increases the processing capacity of a coke drum by reducing the "buffer zone" necessary to preclude foam-overs. Using the above described drum as an example, injection of AF agent to kill the foam when the drum is at 75% of internal volume instead of 66% of internal volume provides a 13% volume increase in coke production. The resulting increase in coke capacity will directly lead to increased fluid and gas production from the coke drum.

Injection of the non-silicone AF agent generally is determined by the quantity of feedstock within drum 18 (calculated based on the fill time cycle for the drum), the desired coke material and required fluid production. Injection volumes of non-silicone AF agent will generally range from about 0.03 gallons/barrel of feedstock to about 1.0 gallons/barrel of feedstock entering the coke drum during the injection time frame. The preferred injection volumes will range from 0.03 to about 0.5 gallons of AF agent per barrel of feedstock entering the coke drum during the injection time frame. When using tire oil as the AF agent the most preferred injection volume will be from about 0.03 to about 0.25 gallons/barrel of feedstock entering the coke drum during the injection time frame. These quantities will be sufficient to control the foam layer and subsequently initiate the induction period.

Method for Controlling a Foam Layer within a Coke Drum

In addition to the non-silicone AF agent method for precluding foam-over, the current invention also provides a method for managing, i.e. controlling, the height of the foam layer during the coking process. This method differs from the prior art practices of preventing the formation of foam layer or simply killing the foam layer with the initial injection of AF agent. Further, in the preferred controlled foaming method, the current invention does not allow the foam layer to grow unchecked until the drum is two-thirds full. Any AF agent is suitable for use in the controlled foaming method; however, for the reasons discussed above, a non-silicone AF agent is preferred. The preferred non-silicone AF agent is tire oil or slurry oil. The controlled foaming method of the current invention is practiced under the conventional operating temperatures and pressures for the coking system in use.

In the controlled foaming method of the current invention, the foam layer, also referred to as a foam front, is monitored during filling of the coke drum. The initial injection of antifoam agent occurs when the foam layer reaches a height of about one to ten feet, preferably not more than five feet, above the liquid mass of the feedstock. This initial injection provides sufficient AF agent to reduce the foam layer by about 40% to about 100% of its original height. Preferably, the foam layer is reduced by 50% to 75% of its original height. Alternatively, AF agent injection begins immediately upon detection of a foam layer. In either embodiment, injection of AF agent continues intermittently as described below.

While the current invention permits cyclical injections of sufficient AF agent to reduce the foam layer by 100%, that quantity of AF agent should be less than that amount needed to initiate the induction period, i.e. the cyclical injections of AF agent do not kill the foam. Thus, the controlled foaming method is designed to preserve the fluidized state of the feedstock within the coke drum until the drum reaches a desired fill level. Thus, the cyclical injections of AF agent maximize the production of liquids from the coke drum by controlling the foam height until the feedstock reaches the maximum designed fill level. Typically, the controlled foaming method will increase the maximum design fill level of a coke drum when compared to methods which do not inject AF agent until later in the fill cycle.

Accordingly, during filling of the drum, the current invention cyclically injects AF agent into the coke drum to maintain the foam layer at the desired level. To minimize the risk of killing the foam layer, the AF agent injection rate and volume preferably permits a slight degree of foaming, i.e. a foam layer between about one to about three feet. Preferably, the foam layer will be maintained between one and two feet above the fluid feedstock level. Even if the foam layer is eliminated, the volume of AF agent used is preferably less than that amount needed to initiate the induction period, thereby permitting subsequent reforming of the foam layer.

As the feedstock level approaches the maximum design capacity, the desired foam layer height will be carefully monitored to preclude foam-over. Management of the foam layer on approach to maximum design capacity provides insurance against foam-over while maintaining the desired fluid state within the feedstock for the maximum period of time. Thus, the method of the current invention selectively delays initiation of the induction period in order to optimize production of liquids from the feedstock while improving the capacity of the coke drum.

As noted above, this method thereby preserves the fluidized state of the feedstock within the drum until the induction period is initiated. For a coke drum having a diameter of about 24 feet and a straight line length of about 82 feet, the controlled foaming method will inject AF agent through a nozzle having a diameter of about one inch at a rate of about one gallon per minute to about three gallons per minute. One skilled in the art will recognize that the nozzle size is merely exemplary and that sizes will vary from drum to drum depending on operating conditions. The injection time period necessary to reduce the foam layer the desired amount will vary depending upon the type of feedstock. Injection time periods are managed to achieve a 50% to about 75% reduction in foam height. Thus, time period for each injection of the AF agent injection may be managed observing the foam layer. Typically, these observations are carried out by sensors, such as nuclear level indicators, commonly installed on coke drums. Preferably, the non-silicone AF agent is injected at a temperature between about 425° C. to about 460° C. (about 800° F. to about 860° F.).

For discussion purposes, this paragraph assumes that the controlled foaming method of the current invention is practiced in a coke drum having a capacity of about 50,000 barrels per day with a nine hour fill cycle. Under standard practices, the AF agent injection occurs over the last 7.5 hours of the fill cycle and about 75 barrels of AF agent will be required. During the last 7.5 hours of the fill cycle, about 41,666 barrels of feed will enter the coke drum. Injections of AF agent are controlled such that injections occur for one minute intervals with one minute rest periods between each injection. Under these conditions, about 3333 gallons of AF agent are cyclically injected into the drum during the last 7.5 hours of the fill cycle. Each injection lasts about one minute and provides about 0.16 gallons of AF agent to the drum at an injection rate of about 15 gallons per minute. Thus, in this example, the cyclic mode provides for one minute injections of AF agent followed by one minute rest periods to permit re-establishment of a foam layer.

The foregoing describes the use of an AF agent in an exemplary coke drum. However, this method will have application regardless of coke drum size, processing capabilities and configuration. While the volume of injected AF agent may be controlled in response to sensor readings, the injected volume of AF agent may also be determined by the volume of feedstock entering the coke drum, the desired coke material and required fluid production.

Injection volumes of AF agent will generally range from about 0.03 gallons/barrel of feedstock to about 1.0 gallons/barrel of feedstock entering the coke drum during the total cyclic injection period. Thus, as described in the foregoing example, the volume of feedstock entering the drum between the initial injection of AF agent until the final injection of AF agent is used to determine the total volume of AF agent required in this method. When using tire oil as the AF agent the preferred injection volume will be from about 0.03 to about 0.25 gallons/barrel. Typical AF agent injection flow rates will range from about one gallon/minute to about 40 gallons/minute. Preferred AF agent injection flow rates will range from about 1 gallon/minute to about 15 gallons/minute.

Injection periods may range from fifteen seconds to three minutes with rest periods between injections of about fifteen seconds to about ten minutes. In a preferred embodiment, injection periods may range from about thirty seconds to about 2 minutes with rest periods of about one to three minutes. More preferably, the injection intervals will last about one minute with rest periods between injections of about two to three minutes. As noted above, the rest period permits re-establishment of the foam layer. The frequency of injections can be preset and controlled electronically by conventional operator software and hardware devices. Alternatively, injections may be manually controlled by an operator observing foam level data provided by coke drum sensors or by the operator following a predetermined pattern of injections and rest periods.

While AF agent injection may begin immediately upon detection of a foam layer, the preferred method initiates cyclic injections of AF agent at a predetermined time in the fill cycle or in response to sensor readings reflecting the height of the foam layer. Thus, initiation of AF agent may be controlled by known process controls or by an operator monitoring data received from drum sensors. Preferably, cyclic AF agent injections begin when about 10% to about 30% of the fill cycle has elapsed. More preferably, cyclic AF agent injections begin when about 15% to about 20% of the fill cycle has elapsed. In the foregoing example, injection of AF agent began after 1.5 hours or 16% of the fill cycle time period had elapsed. As known to those skilled in the art, the time period for the fill cycle step is readily determined based on the nature of the feedstock, the desired products from the coking process, the coke drum internal volume and feedstock flow rate into the coke drum.

In the above method, the cyclical injections of non-silicone AF agent continue until the volume of coke feedstock reaches a predetermined level. Preferably, each injection occurs when the foam front reaches a predetermined height. Foam layer heights of about one to about three feet above the fluid layer will be preferred. As noted above, injections preferably occur when the foam front reaches a height of about one to about two feet above the fluid layer. Management of the foam layer in this manner permits filling of the coke drum to a range between about 70% and about 80% of total drum volume while reducing the risk of foam-over. Preferably, the cyclic injections of non-silicone AF agent permits filling of the coke drum to about 75% of total volume without producing a foam-over.

As known to those skilled in the art, once the drum has filled to the desired level, the foam layer is "killed," i.e. fully collapsed with initiation of the induction period by injection of a sufficient quantity of AF agent. Thus, when the coke drum has filled to about 70% to about 80% of total internal volume, more preferably when the drum has filled to 75% of total internal volume, a sufficient quantity of AF agent is injected to initiate the induction period.

Practice of the foregoing method has been shown to increase liquids production by as much as six percent. The increased liquids production is believed to be a result of the improved fluidity of the feedstock within the drum during the controlled management of the foam layer and increased usage of the total internal volume of the drum.

In addition to increasing liquids production, this method reduces the likelihood of a foam-over thereby allowing the operator to use a larger percentage of the drum's total capacity during the fill cycle. As a further advantage, when producing fuel grade coke, this method will produce BB sized shot coke when the feedstock is high in asphaltene content. When compared to shot coke produced by prior art methods, the resulting shot coke of the controlled foaming method has more uniform porosity and density. Typically, the resulting shot coke is pure shot in contrast to the bonded shot coke produced by prior art methods.

Other embodiments of the current invention will be apparent to those skilled in the art from a consideration of this specification or practice of the invention disclosed herein. However, the foregoing specification is considered merely exemplary of the preferred embodiments of the current invention. The following claims define the true scope of the current invention.

I claim:

1. A method for precluding foam-over during a petroleum coking operation comprising:
    filling a coke drum with a coke feedstock;
    monitoring the coke feedstock level within said coke drum;
    stopping flow of coke feedstock when said feedstock occupies from about 66% to about 80% of the internal volume of said coke drum;
    when said coke drum is filled between about 60% to about 70% of its total internal capacity and prior to stopping the flow of feedstock, injecting into said coke drum from about 0.03 gallons to about 0.5 gallons of a non-silicone anti-foam agent per barrel of feedstock entering said drum thereby precluding a foam layer on the surface of said feedstock from entering an overhead line carried by said coke drum;
    wherein said non-silicone anti-foam agent is selected from the group consisting of tire oil having an aromatic concentration by weight greater than 70% and a slurry oil having an aromatic concentration by weight greater than 70%.

2. The method of claim 1, wherein said step of stopping flow of coke feedstock occurs when said feedstock fills from about 70% to about 80% of the internal volume of said coke drum.

3. The method of claim 1, wherein said non-silicone anti-foam agent has an aromatic concentration by weight greater than 90%.

4. The method of claim 1, further comprising the step of killing the foam when the coke drum has filled to about 75% of its internal capacity.

5. A method for controlling a foam layer in a coke drum during the fill cycle of a coking process comprising:

filling a coke drum with a coke feedstock;

during the step of filling said coke drum, monitoring the growth of a foam layer on said feedstock;

during the flow of feedstock into said coke drum, cyclically injecting into said coke drum from about 0.03 gallons to about 1.0 gallons of a non-silicone anti-foam agent per barrel of feedstock entering said coke drum wherein the volume of anti-foam agent does not initiate the induction period within said feedstock;

wherein said anti-foam agent is selected from the group consisting of tire oil having an aromatic concentration by weight greater than 70% and a slurry oil having an aromatic concentration by weight greater than 70%.

6. The method of claim 5, wherein each injection of anti-foam agent provides sufficient anti-foam agent to said coke drum to reduce the height of the foam layer by about 40% to about 100% of its original height.

7. The method of claim 5, wherein said step of injecting said anti-foam agent initially occurs upon detection of a foam layer on said feedstock.

8. The method of claim 5, wherein said step of cyclically injecting said anti-foam agent injects anti-foam agent for a period of about thirty seconds to about two minutes followed by a rest period of about 30 seconds to about five minutes.

9. The method of claim 5, further comprising the steps of determining the fill time required to fill said coke drum to the desired internal volume and beginning the cyclical injection of anti-foam agent when about 10% to about 30% of said fill time has elapsed.

10. The method of claim 9, further comprising the step of killing said foam layer and initiating the induction period within said feedstock when said feedstock occupies between about 70% to about 80% of said coke drum's internal volume.

11. The method of claim 5, further comprising the steps of determining the total volume of anti-foam agent to be injected during the fill cycle and wherein the total injection of said anti-foam agent provides from about 0.03 gallons of anti-foam agent per barrel of feedstock entering said drum during the total cyclic injection period to about 0.5 gallons of anti-foam agent per barrel of feedstock entering said drum during the total cyclic injection period.

12. The method of claim 5, wherein the anti-foam agent injection flow rate is between about one gallon per minute and about forty gallons per minute.

13. A method for controlling a foam layer in a coke drum during the fill cycle of a coking process comprising:

filling a coke drum with a coke feedstock;

during the step of filling said coke drum, monitoring the growth of a foam layer on said feedstock; and, initiating cyclical injections of an anti-foam agent at a rate of from about 0.03 gallons to about 1.0 gallons per barrel of feedstock entering into said coke drum when said foam layer reaches a height above said feedstock of about one to about ten feet, thereby reducing the height of said foam layer on said feedstock without initiating the induction period within said feedstock;

wherein said anti-foam agent is a non-silicone anti-foam agent selected from the group consisting of tire oil having an aromatic concentration by weight greater than 70% and a slurry oil having an aromatic concentration by weight greater than 70%.

14. The method of claim 13, wherein said filling step is complete when said feedstock occupies from about 66% to about 80% of the internal volume of said coke drum.

15. The method of claim 13, wherein sufficient anti-foam agent is injected into said coke drum to reduce the height of the foam layer by about 40% to about 100% of its original height.

16. The method of claim 13, further comprising the steps of determining the fill time required to fill said coke drum to the desired internal volume and beginning the cyclical injection of anti-foam agent when about 10% to about 30% of said fill time has elapsed.

17. The method of claim 16, further comprising the step of killing said foam layer and initiating the induction period within said feedstock when said feedstock occupies between about 70% to about 80% of said coke drum's internal volume.

18. The method of claim 13, further comprising the steps of determining the total volume of anti-foam agent to be injected during the fill cycle and wherein the total injection of said anti-foam agent provides from about 0.03 gallons of anti-foam agent per barrel of feedstock entering said drum during the total cyclic injection period to about 0.5 gallons of anti-foam agent per barrel of feedstock entering said drum during the total cyclic injection period.

19. The method of claim 13, wherein the anti-foam agent injection flow rate is between about one gallon per minute and about forty gallons per minute.

20. A method for controlling a foam layer in a coke drum during the fill cycle of a coking process comprising:

filling a coke drum with a coke feedstock;

during the step of filling said coke drum, monitoring the growth of a foam layer on said feedstock;

cyclically injecting an anti-foam agent at a rate of from about 0.03 gallons to about 1.0 gallons per barrel of feedstock entering into said coke drum for a period of about fifteen seconds to about three minutes followed by a rest period of about fifteen seconds to about ten minutes, thereby reducing the height of said foam layer on said feedstock without initiating the induction period within said feedstock;

wherein said anti-foam agent is selected from the group consisting of tire oil having an aromatic concentration by weight greater than 70% and a slurry oil having an aromatic concentration by weight greater than 70%.

21. The method of claim 20, wherein said filling step is complete when said feedstock occupies from about 66% to about 80% of the internal volume of said coke drum.

22. The method of claim 20, wherein said step of injecting said anti-foam agent initially occurs when said foam layer reaches a height above said feedstock of about one to about ten feet.

23. The method of claim 20, wherein said step of injecting said anti-foam agent initially occurs when said foam layer reaches a height above said feedstock of about one to about five feet.

24. The method of claim 20, wherein sufficient anti-foam agent is injected into said coke drum to reduce the height of the foam layer by about 40% to about 100% of its original height.

25. The method of claim 20, wherein said step of injecting said anti-foam agent initially occurs upon detection of a foam layer on said feedstock.

26. The method of claim 20, further comprising the steps of determining the fill time required to fill said coke drum to the desired internal volume and beginning the cyclical injection of anti-foam agent when about 10% to about 30% of said fill time has elapsed.

27. The method of claim 26, further comprising the step of killing said foam layer and initiating the induction period within said feedstock when said feedstock occupies between about 70% to about 80% of said coke drum's internal volume.

28. The method of claim 20, further comprising the steps of determining the total volume of anti-foam agent to be injected during the fill cycle and wherein the total injection of said anti-foam agent provides from about 0.03 gallons of anti-foam agent per barrel of feedstock entering said drum during the total cyclic injection period to about 0.5 gallons of anti-foam agent per barrel of feedstock entering said drum during the total cyclic injection period.

29. The method of claim 20, wherein the anti-foam agent injection flow rate is between about one gallon per minute and about forty gallons per minute.

\* \* \* \* \*